Figure 1:
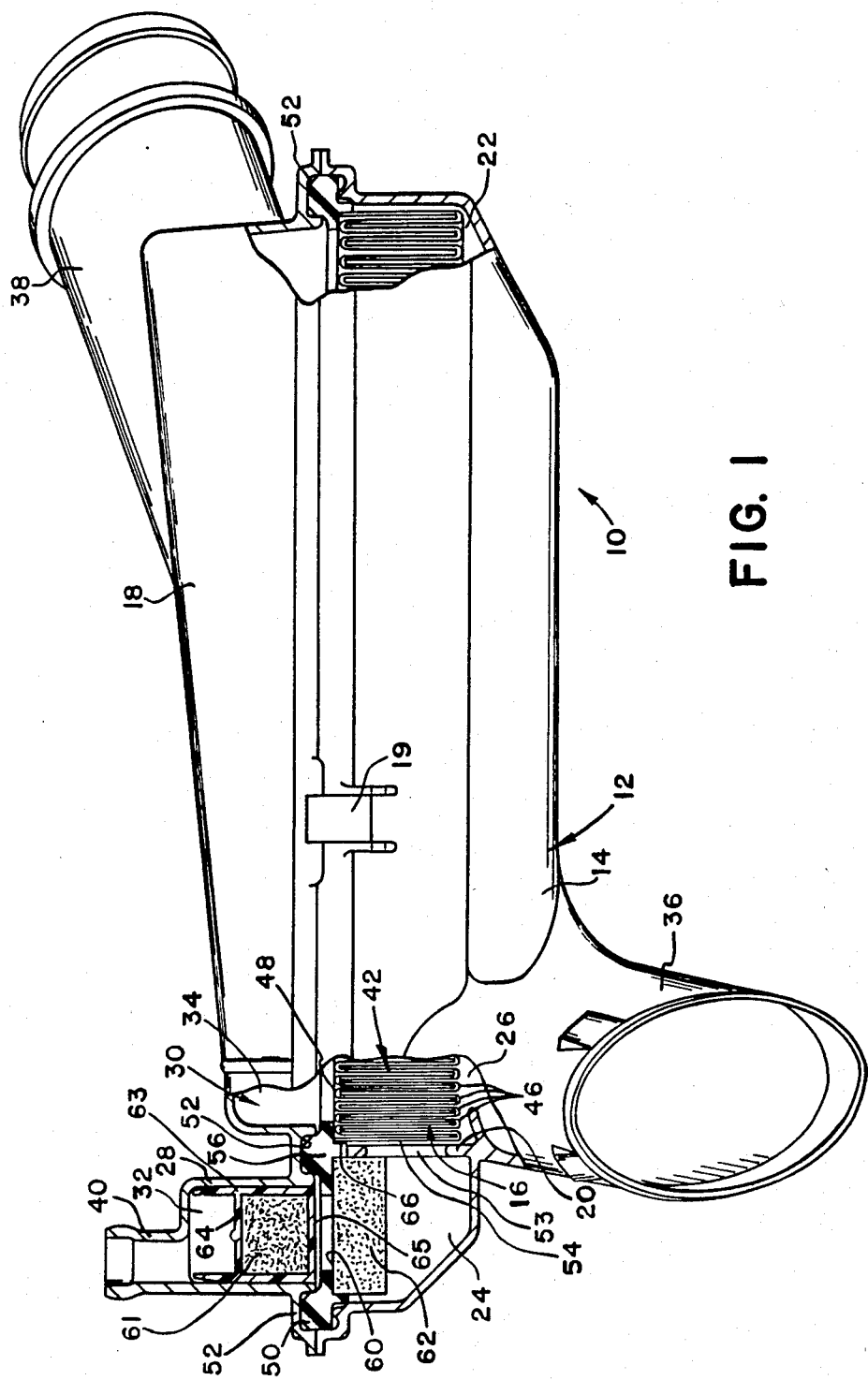

United States Patent [19]

Tettman

[11] Patent Number: 4,861,359
[45] Date of Patent: Aug. 29, 1989

[54] DUAL FUNCTION AIR FILTER

[75] Inventor: Barton J. Tettman, Shakespeare, Canada

[73] Assignee: Allied-Signal Inc., Morristown, N.J.

[21] Appl. No.: 309,564

[22] Filed: Feb. 10, 1989

[51] Int. Cl.⁴ ............................................. B01D 46/00
[52] U.S. Cl. .................................. 55/419; 55/482; 55/484; 55/502; 55/510; 55/521; 123/198 E; 123/41.86
[58] Field of Search ................. 55/482, 484, 497, 500, 55/502, 521, 510; 123/41.86, 198 E

[56] References Cited

U.S. PATENT DOCUMENTS

| | | | |
|---|---|---|---|
| 3,385,034 | 5/1968 | Farr | 55/502 |
| 3,431,335 | 3/1969 | Henning | 55/502 |
| 3,828,529 | 8/1974 | Frey et al. | 55/419 |
| 4,236,901 | 12/1980 | Kato et al. | 55/497 |
| 4,396,407 | 8/1983 | Reese | 55/419 |
| 4,790,864 | 12/1988 | Kostun | 55/497 |

Primary Examiner—Bernard Nozick
Attorney, Agent, or Firm—Ken C. Decker; William N. Antonis

[57] ABSTRACT

An engine induction air filter element and a positive crankcase ventilation breather element are combined into a single discardable cartridge which is received within an air cleaner housing in a vehicle induction air system. The induction air filter media is comprised of an array of pleats, the tips of which respectfully define the upstream and downstream planes of the filter. A sealant material circumscribes the perimeter of the downstream plane of the induction air filter, and the sealant material on one end thereof includes a projecting portion which supports the breather air filtering media on the one side of the induction air filtering media, with a gap therebetween which receives a partition which is a part of the air cleaner housing. The partition includes a flow restricting aperture, which is closed by the transverse surface of one of the end pleats of the induction air filtering media. Crankcase ventilating air passes through the breather element and then through the aperture, with any oil remaining in the air communicated through breather filter air element being entrained on the transverse surface of the end pleat.

14 Claims, 2 Drawing Sheets

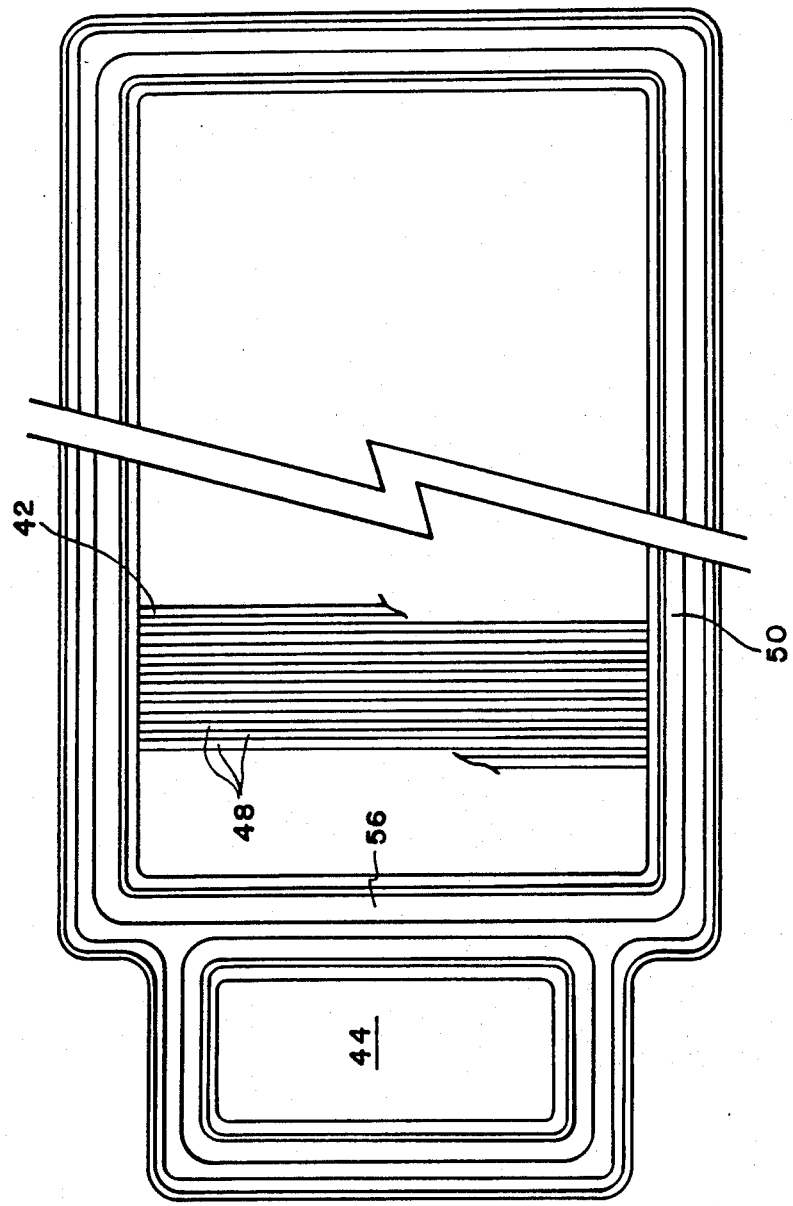

DUAL FUNCTION AIR FILTER

This invention relates to a combination engine induction air filter and positive crankcase ventilation breather element for an internal combustion engine.

Engine induction air filters are necessary to filter the combustion air of an internal combustion engine. One popular type of inlet air filter is a panel air filter, which consists of a longitudinal array of tapered pleated paper, or other appropriate filtering material, such as an airlaid batt. Such filters are mounted in a housing and are connected both to an ambient air supply and to the induction manifold of the engine.

In order to better control emissions, modern internal combustion engines used on automobiles are equipped with a positive crankcase ventilation system. These systems require one or more breather elements to remove oil and/or contaminants in the crankcase vent air. In existing engines, separate filter elements are required to perform both functions, although both have been commonly mounted within the same housing. Although the induction air filter element is replaced as a normal maintenance item, vehicle owners often neglect replacement of the breather element.

The present invention incorporates a single, replaceable filter cartridge within an air cleaner housing in which the breather element and air filter element are integral with one another and therefore must be replaced at the same time. Furthermore, the air filtered by the breather element passes through one of the end pleats of the air filter element, thereby trapping any oil that remains in the crankcase vent air after it passes through the breather element.

These and other advantages of the present invention will become apparent from the following description, with reference to the accompanying drawings, in which:

FIG. 1 is a transverse cross-sectional view of an air cleaner housing and replaceable filter element installed therein made according to the teachings of the present invention; and FIG. 2 is a top Plan view of the filter element illustrate FIG. 1.

Referring now to the drawings, an air cleaner assembly generally indicated by the numeral 10 includes a housing generally indicated by the numeral 12 consisting of shell 14 which receives a removable, replaceable filter cartridge generally indicated by the numeral 16, and a cover generally indicated by the numeral 18 which is clamped to the shell 14 by normal clamps 19. A partition 20 in the shell 14 divides the cavity 22 into a breather air outlet section 24 and an induction air inlet section 26. Similarly, partition 28 on the cover 18 divides the cavity 30 within the cover 18 into a breather air inlet section 32 and an induction air outlet section 34. Induction air inlet 36 communicates the induction air inlet section 26 with a source of ambient air, and induction air outlet 38 communicates the induction air outlet section 34 with the induction manifold of the vehicle engine. A breather air inlet 40 communicates breather air inlet section 32 with the positive crankcase ventilation system of the engine.

The cartridge 16 includes air filter media 42. Air filter media 42 consists of pleated paper, the pleats of the paper comprising a longitudinally extending array of generally parallel pleats 44. Each of the pleats extend between upstream tips 46 and downstream tips 48. Upstream tips 46 form an upstream plane where ambient air enters the filtering media 42 and the tips 48 define a downstream plane where ambient air which has been filtered passes out of the media 42 and into the inlet air outlet section 34. The media 42 is bounded by side edges and end edges defining the perimeter of media. A band of sealing material generally indicated by the numeral 50 extends around the perimeter formed by the edges of the media and is adapted to sealingly engage corresponding sealing surfaces 52 of the cover 18 to thereby form a sealing connection therebetween. As can be seen, the sealing material 50 is supported on the downstream plane defined by the tips 48 of the filtering media 42. Sealing material 50, may be of any suitable type well known to those skilled in the art, such as rubber, synthetic elastomers, etc.

The partition 20 defines a flow restricting aperture 53 which communicates the breather air outlet section 24 with the induction air inlet section 26. The partition 20 engages the end of the media 42 defined by the transverse surface 54 of the end pleat. Transverse surface 54 closes aperture 53 and thereby acts as a barrier preventing any oil or other foreign material entrained in the air passing through the aperture 53 from reaching the induction air inlet section 26. Since the elastomer 50 carried on the downstream plane defined by the tips 48 closes the pleats, the induction air is prevented from passing through the pleats at opposite ends of the media 42 supporting the sealing material 50.

The strip of sealing material 50 generally indicated by the numeral 56 which bridges the partition 20 includes a projecting portion 58 which engages the upstream plane 60 of a breather filter media 62. Breather filter media 62 is an integral part of cartridge 16 and may commonly be a nonwoven fiber or open celled foam filtering media. If needed, additional breather filter media 61 is mounted within inlet section 32 in a carrier 63. Apertures (not shown) are provided in upper and lower edges 64, 65 of the carrier 63. The additional media 61 supplements media 62. The upstream plane 60 of media 62 receives air from the crankcase ventilating system which has passed through media 61, but in which substantial oil vapor may still be entrained. The breather filter media 62 absorbs the remaining oil vapors from the air, and retains them in the breather air inlet section 32. A conventional drain (not shown) is provided which automatically drains oil vapor from the housing. Projecting Portion 58 secures the breather filter media 62 to the filtering media 42 and disposes the breather filter media 62 in such a position that a gap is formed between the corresponding edge of breather filter media 62 and the transverse face 54 of the end pleat of filter media 42. This gap receives the partition 20, and also receives a projecting section 66 of sealing material 50 which projects from portion 56 of sealing material 50 to sealing engage the end of the partition 20.

In operation, engine induction air is communicated from a source of ambient air through the induction air filter inlet 36, into the induction air inlet section 26, through the air filter media 42 and into the induction air outlet section 34. Filtered engine induction air is then communicated out of the induction air outlet 38 to the induction manifold of the vehicle engine, the only difference in vacuum levels between the sections 34 and 26 being due to the pressure drop caused by the filtering media 42, which, in a new filter is almost negligible.

Crankcase vent air is communicated through the breather air inlet 40 into the breather air inlet section 32.

Breather air then passes through the breather filter media 61 and 62, which removes the majority of oil vapor entrained in the breather air. Eventually, the filtering media 61 and 62 become saturated, and any excess oil flows back up into the section 32 and drains through drain (not shown). The aperture 53 creates a pressure differential between the induction air inlet section 26 and the breather air outlet section 24, so that the breather air outlet section 24 is much closer to atmospheric pressure than is the vacuum level in the section 26. Any oil vapor which remain entrained in the air passing from section 24 into section 26 are removed by the barrier created by the transverse face 54 of the end pleat of the filtering media 42. Since the pleated paper comprising filter media 42 is permeable to air, but also acts as a filter, the oil entrained in the breather air is readily absorbed by the transverse face 54. This oil is kept out of the induction air flow, since the pleat which is defined by transverse face 54 is a so-called "dead pleat", the tip 48 of the pleat being sealed by the sealant material 50. Since the sealant material 50 covers the tips of several pleats adjacent the ends of filtering media 42, induction air flow is prevented from passing through these pleats, so that the transverse face 54 acts as a barrier to prevent excess oil passing through the breather filtering media 62 from fouling the inlet 36.

The induction air filter on most vehicles is serviced regularly at recommended intervals as a clogged filter substantially reduces gasoline mileage and may, if the filtering media tears, cause substantial engine damage. Accordingly, consumers are well aware of the fact that the induction air filter needs replacement at regular intervals, but consumers are much less aware of the fact that the breather element air filter must also be replaced. The induction air filter is normally replaced while the breather air filter is not. One of the advantages of the present invention is that the breather media 62, since it is attached to the induction air filter by the portion 58 of sealing material 50, is automatically removed and replaced when the induction air filter is serviced. Although the media 61 is not automatically replaced when the induction air filter is serviced, the vehicle owner, by replacement of the media 62, is assured that a substantial portion of the breather media is replaced at regular intervals. Another advantage of the present design is that the end pleat of the induction air filter serves as a barrier to prevent any oil that has already passed through the breather air filtering media 44 from passing into the induction air inlet section 26.

The filter cartridge 16 is removed and replaced in the conventional manner, by removing the cover 18 by release of the conventional closure members 19 attaching the cover to the shell 14. The cartridge 16 can then be removed and a new one installed. The cover 18 is then reinstalled on the shell 14.

I claim:

1. An engine induction air filter element and positive crankcase ventilation breather element combined into a single discardable cartridge for an air cleaner housing installed in an internal combustion engine induction air system, said air filter element comprising a longitudinally extending array of air filter media, said array having edges defining the perimeter of said array, a band of sealing material extending around said perimeter for providing sealing between said air filter element and said housing, said sealing material on at least one edge of said air filter media including a projecting portion projecting beyond said one edge of said air filter media, said breather element comprising breather media having edges, one edge of said breather media engaging the projecting portion of the sealing material on said one edge of the air filter media whereby the sealing material secures the breather media to said air filter media and also seals both the one edge of the air filter media and the one edge of the breather media against said housing, and a band of said sealing material extending around the other edges of said breather media.

2. A combined engine induction air filter element and positive crankcase ventilation breather element as claimed in claim 1, wherein both said air filter media and said breather media are defined by an upstream plane and a downstream plane, said sealing material being supported on the upstream plane of said breather material but on the downstream plane of said air filter media.

3. A combined engine induction air filter element and positive crankcase ventilation breather element as claimed in claim 2, wherein said air filter media includes a portion receiving the air issuing from the downstream plane of said breather media.

4. A combined engine induction air filter element and positive crankcase ventilation breather element as claimed in claim 3, wherein said receiving portion of the air filter media is defined on said one edge of said air filtering media, said receiving portion supporting said sealing material whereby engine induction air cannot pass between the upstream and downstream planes of the air filtering media through the receiving portion of the air filtering media.

5. A combined engine induction air filter element and positive crankcase ventilation breather element as claimed in claim 4, wherein said sealing material on said one edge of said air filter media includes a projecting section extending into a gap defined between said one edge of the air filter media and the one edge of the filter media.

6. A combined engine induction air filter element and positive crankcase ventilation breather element as claimed in claim 2, wherein said air filter media includes a longitudinally extending array of pleats extending in the direction of air flow through the air filter element, each of said pleats terminating in tips on opposite ends of the pleats, the tips on one end of said pleats defining the upstream plane of said air filter media and the tips on the other end of said pleats defining the downstream plane of the air filter media.

7. A combined engine induction air filter element and positive crankcase ventilation breather element as claimed in claim 6, wherein each of said pleats includes a surface extending transversely relative to said array, said one edge of said air filter media being defined by the transversely extending surface of the end pleat defining the one edge of said air filter media, said transversely extending surface having a portion receiving the air issuing from the downstream Plane of said breather media.

8. A combined engine induction air filter element and positive crankcase ventilation breather element as claimed in claim 7, wherein the sealing material seals the tip of said end pleat defining the one edge of said air filter media.

9. An engine induction air filter element and positive crankcase ventilation breather element combined into a single discardable cartridge and a housing for said cartridge, said housing including a shell cooperating with a removable cover to define a cavity receiving said cartridge, induction air inlet and outlet means on said shell and said cover respectively, breather air inlet means on said housing, said cover and said shell each including partitions cooperating to divide the cavity into an induction air section and a breather section, said air filter element comprising a longitudinally extending array of air filter media received in the induction air section of said cavity, said array having edges defining the perimeter of said array, a band of sealing material extending around said perimeter for providing sealing between said air filter element and said housing, said breather element comprising breather media received in the breather section of said cavity and connected to said air filter media through said sealing material, said breather element dividing said breather section into a breather air inlet section communicating with the breather air inlet means and a breather air outlet section, said partitions both sealingly engaging the sealing material, one of said partitions including an aperture communicating the breather air outlet section with the induction air inlet means.

10. The invention as claimed in claim 9, wherein said air filter media includes a portion closing said aperture means whereby air communicating from said breather air outlet section to said induction air inlet means communicates through said portion of the air filter media.

11. The invention as claimed in claim 10, wherein said portion closing said aperture means is defined by a portion of said one edge of said air filter media.

12. The invention as claimed in claim 11, wherein one edge of said breather media cooperates with the one edge of said air filter media to define a gap therebetween, said sealing material on said one edge of said air filter media including a projecting portion bridging said gap to engage the one edge of the breather media to thereby secure the latter to the air filter media, said one partition extending into said gap to engage said sealing material.

13. The invention as claimed in claim 12, wherein said air filter media includes a longitudinally extending array of pleats extending in the direction of air flow through the air filter element, each of said pleats terminating in tips on opposite ends of the pleats, the tips on one end of said pleats defining the upstream plane of said air filter media and the tips on the other end of said pleats defining the downstream plane of the air filter media, each of said pleats including a surface extending transversely relative to said array, said one edge of said air filter media being defined by the transversely extending surface of the end pleat defining the one edge of said air filter media, said portion of said air filter media closing said aperture means being the transversely extending surface of said one pleat.

14. The invention as claimed in claim 12, wherein said sealing material on said one edge of said air filter media includes a projecting section extending into a gap defined between said one edge of the air filter media and the one edge of the filter media.

* * * * *